(12) United States Patent
Freitag et al.

(10) Patent No.: US 7,520,273 B2
(45) Date of Patent: Apr. 21, 2009

(54) EXHAUST-GAS RECIRCULATION DEVICE AND METHOD FOR OPERATING AN EXHAUST-GAS RECIRCULATION DEVICE

(75) Inventors: Achim Freitag, Wolfenbüttel (DE); Jörn Müller, Sickte (DE); Lothar Nee, Wolfsburg (DE); Werner Aberle, Leiferde (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 11/717,275

(22) Filed: Mar. 13, 2007

(65) Prior Publication Data

US 2007/0214771 A1    Sep. 20, 2007

Related U.S. Application Data

(63) Continuation of application No. PCT/DE2005/001261, filed on Jul. 15, 2005.

(30) Foreign Application Priority Data

Sep. 14, 2004  (DE) ............... 10 2004 044 893

(51) Int. Cl.
  *F02M 25/07* (2006.01)
  *F02B 47/08* (2006.01)
  *F02B 33/44* (2006.01)

(52) U.S. Cl. ............. 123/568.21; 60/605.2; 123/568.12

(58) Field of Classification Search ............ 123/568.11, 123/568.12, 568.17, 568.18, 568.2, 568.21; 60/605.2; 701/108
See application file for complete search history.

(56) References Cited

U.S. PATENT DOCUMENTS 5,203,311 A     4/1993   Hitomi et al.
5,309,886 A *   5/1994   Hitomi et al. .............. 60/605.2
5,682,746 A    11/1997   von Hoerner (Continued)

FOREIGN PATENT DOCUMENTS

DE          19521573 A1    12/1996

(Continued)

OTHER PUBLICATIONS

Christian Nellen, Konstantinos Boulouchos, "Aufgeladene Gasmotoren mit AGR und Dreiwege-Katalysator", MTZ Motortechnische Zeitschrift, vol. 61, No. 1, Jan. 2000, Vieweg Publishers, Wiesbaden, Germany.

*Primary Examiner*—Willis R Wolfe, Jr.
(74) *Attorney, Agent, or Firm*—Manfred Beck, P.A.

(57) ABSTRACT

An exhaust-gas recirculation device for an internal combustion engine, in particular for a diesel engine of a passenger car, includes an air-supply line connected to an air inlet of the internal combustion engine and includes an exhaust-gas line connected to an exhaust-gas outlet of the internal combustion engine. A turbine, which drives a compressor disposed in the air-supply line, is disposed in the exhaust-gas line. The exhaust-gas line is connected to the air-supply line via an exhaust-gas recirculation line branching off in flow direction behind the turbine. An adjustable throttle is disposed in the air-supply line in flow direction in front of the compressor in order to achieve higher exhaust-gas recirculation rates. A method for operating an exhaust-gas recirculation device for an internal combustion engine is also provided.

2 Claims, 2 Drawing Sheets

U.S. PATENT DOCUMENTS

| | | | |
|---|---|---|---|
| 6,062,027 A | 5/2000 | Landfahrer et al. | |
| 6,338,245 B1 | 1/2002 | Shimoda et al. | |
| 6,571,765 B2 | 6/2003 | Kuboshima et al. | |
| 6,742,335 B2 * | 6/2004 | Beck et al. | 60/605.2 |
| 6,899,090 B2 * | 5/2005 | Arnold | 123/568.12 |
| 6,945,236 B2 * | 9/2005 | Nakai et al. | 60/605.2 |
| 6,988,365 B2 * | 1/2006 | Sasaki | 60/605.2 |
| 2005/0172613 A1 * | 8/2005 | Blomquist | 60/605.2 |

FOREIGN PATENT DOCUMENTS

| | | | | |
|---|---|---|---|---|
| DE | 19821792 A1 | 12/1998 | | |
| DE | 69130976 | 7/1999 | | |
| DE | 10101343 A1 | 7/2002 | | |
| DE | 10246405 A1 | 5/2003 | | |
| DE | 10349129 A1 | 5/2004 | | |
| EP | 0489263 A2 | 6/1992 | | |
| EP | 1085176 A2 | 3/2001 | | |
| JP | 06257518 A * | 9/1994 | | 701/108 |
| JP | 6280684 A | 10/1994 | | |
| JP | 2000145501 A | 5/2000 | | |
| JP | 2001073884 | 3/2001 | | |
| JP | 2002188524 A * | 7/2002 | | 701/108 |
| JP | 2002285854 A | 10/2002 | | |
| JP | 2004150319 A | 5/2004 | | |

* cited by examiner

EXHAUST-GAS RECIRCULATION DEVICE AND METHOD FOR OPERATING AN EXHAUST-GAS RECIRCULATION DEVICE

CROSS-REFERENCE TO RELATED APPLICATIONS

This application is a continuation, under 35 U.S.C. §120, of copending International Application No. PCT/DE2005/001261, filed Jul. 15, 2005, which designated the United States; this application also claims the priority, under 35 U.S.C. §119, of German Patent Application No. DE 10 2004 044 893.0, filed Sep. 14, 2004; the prior applications are herewith incorporated by reference in their entirety.

BACKGROUND OF THE INVENTION

FIELD OF THE INVENTION

The invention relates to an exhaust-gas recirculation device for an internal combustion engine, in particular a passenger car diesel engine, having an air-supply line connected to an air inlet of the internal combustion engine and having an exhaust-gas line connected to an exhaust-gas outlet of the internal combustion engine, wherein a turbine is disposed in the exhaust-gas line which drives a compressor disposed in the air-supply line and wherein the exhaust-gas line is connected to the air-supply line via an exhaust-gas recirculation line branching off in flow direction behind the turbine. The invention furthermore relates to a method for operating an exhaust-gas recirculation device for an internal combustion engine, in particular a passenger car diesel engine, having an air-supply line connected to an air inlet of the internal combustion engine and having an exhaust-gas line connected to an exhaust-gas outlet of the internal combustion engine, wherein a turbine is disposed in the exhaust-gas line which drives a compressor disposed in the air-supply line, wherein the exhaust-gas line is connected to the air-supply line via an exhaust-gas recirculation line branching off in flow direction behind the turbine and wherein, during operation of the internal combustion engine, exhaust-gas can flow from the exhaust-gas outlet back to the air inlet via the exhaust-gas recirculation line.

An exhaust-gas recirculation device of the type mentioned above is known from an internal combustion engine described in German Patent Publication No. DE 691 30 976 T2 and in corresponding U.S. Pat. No. 5,203,311. The internal combustion engine includes an exhaust-gas turbocharger wherein an exhaust-gas recirculation line can branch off as a low-pressure line in flow direction behind a turbine of the exhaust-gas turbocharger, wherein the turbine is provided in the exhaust-gas line of the internal combustion engine. The exhaust-gas recirculation line can be connected to the air supply line at a point upstream of a compressor disposed in the air-supply line of the internal combustion engine. A throttle valve for throttling intake air of the internal combustion engine is disposed in the air supply line between an intake port provided upstream from the cylinder of the internal combustion engine and the compressor. The intake air, which can be throttled, includes fresh air and, if applicable, exhaust-gas added to the fresh air, wherein a ratio of fresh air and exhaust-gas in a mixture of fresh air and exhaust-gas cannot be adjusted with the throttle valve. The exhaust-gas recirculation line furthermore includes an exhaust-gas recirculation cooler, and exhaust-gas can be recirculated through the exhaust-gas recirculation line in a high-load range. Furthermore, a further exhaust-gas recirculation line can branch off as a high pressure line upstream from the turbine of the exhaust-gas turbocharger, through which exhaust-gas can be recirculated in a low-load range.

German Patent No. DE 198 21 792 C2 and corresponding U.S. Pat. No. 6,062,027 disclose an internal combustion engine having an exhaust-gas recirculation device including an exhaust-gas turbocharger, a charge air line and an exhaust-gas recirculation line, wherein a nozzle diffuser unit is disposed in the charge air line. An exhaust-gas extraction can be accomplished at an outlet header of the internal combustion engine, specifically upstream of an exhaust-gas turbine of the exhaust-gas turbocharger. A bypass line, which branches of from the charge air line and merges into an inlet header of the internal combustion engine, is provided in parallel to the nozzle diffuser unit in order to control a mass flow rate through the nozzle diffuser unit, wherein the bypass line accommodates a control valve which is embodied as a throttle valve.

German Patent No. DE 195 21 573 C2 and corresponding U.S. Pat. No. 5,682,746 furthermore disclose an exhaust-gas recirculation in a turbocharged internal combustion engine. In this case exhaust-gas from an exhaust-gas pipe is supplied to a turbine of an exhaust-gas turbocharger and a compressor connected to the turbine feeds charge air to a charge air pipe. Exhaust-gas can be extracted from the exhaust-gas pipe into an exhaust-gas line connected to it by a non-return valve. The extracted exhaust-gas does not flow through the turbine of the exhaust-gas turbocharger.

Patent Abstracts of Japan JP 06280684 discloses an exhaust-gas recirculation system of a four stroke engine. Exhaust-gas can be extracted at two different points at an exhaust-gas manifold of the four stroke engine and can be fed either directly to an intake manifold of the four stroke engine or to an intake pipe.

Patent Abstracts of Japan JP 2001073884 discloses a diesel engine with an exhaust-gas recirculation device. In this case, a branch-off for an exhaust-gas recirculation passage is provided in flow direction of the exhaust-gas in front of the turbocharger in an exhaust-gas pipe which is connected to an exhaust-gas manifold of the diesel engine. The exhaust-gas recirculation passage, in which an exhaust-gas cooler is provided, merges in flow direction in front of an intake manifold of the diesel engine into an intake passage.

Furthermore, Patent Abstracts of Japan JP 2002285854 discloses a diesel engine with an exhaust-gas turbocharger and an exhaust-gas recirculation device. In this case, exhaust-gas flows from an exhaust-gas manifold either into a turbine of the exhaust-gas turbocharger or directly into an exhaust-gas recirculation passage of the exhaust-gas recirculation device. The exhaust-gas recirculation passage is connected to an air supply passage in which a compressor of the exhaust-gas turbocharger is disposed and which leads into an exhaust-gas manifold, to be precise, in flow direction behind the compressor.

In addition, German Patent Application Publication No. DE 102 46 405 A1 discloses an internal combustion engine control system for an internal combustion engine having a forced induction system which includes an exhaust-gas turbine in an exhaust-gas pipe connected to an exhaust-gas system and an intake turbine in an intake pipe connected to an intake system. An exhaust-gas recirculation pipe of an exhaust-gas recirculation system branches off from the exhaust-gas system in flow direction in front of the exhaust-gas turbine. The exhaust-gas recirculation system furthermore includes a controlled exhaust-gas recirculation cooler.

Furthermore, German Patent Application Publication No. DE 101 01 343 A1 discloses a method for an exhaust-gas recirculation control in an internal combustion engine with a charger device, an exhaust-gas recirculation line and an exhaust-gas recirculation valve. The internal combustion engine has an exhaust-gas line with a turbine of the charger device and an intake line with a compressor of the charger device. The exhaust-gas recirculation line branches off from the exhaust-gas line in flow direction in front of the turbine and merges into the intake line.

SUMMARY OF THE INVENTION

It is accordingly an object of the invention to provide an exhaust-gas recirculation device and a method for operating an exhaust-gas recirculation device which overcome the above-mentioned disadvantages of the heretofore-known methods and devices of this general type and which achieve high exhaust-gas recirculation rates and allow a recirculation of large amounts of exhaust-gas.

With the foregoing and other objects in view there is provided, in accordance with the invention, in combination with an internal combustion engine having an air inlet and an exhaust-gas outlet, an exhaust-gas recirculation device including:

an air-supply line connected to the air inlet of the internal combustion engine;

an exhaust-gas line connected to the exhaust-gas outlet-of the internal combustion engine;

a compressor disposed in the air-supply line;

a turbine disposed in the exhaust-gas line, the turbine driving the compressor;

an exhaust-gas recirculation line branching off from the exhaust-gas line in flow direction behind the turbine, the exhaust-gas line being connected to the air-supply line via the exhaust-gas recirculation line; and an adjustable throttle disposed in the air-supply line in flow direction in front of the compressor.

In other words, according to the invention, there is provided an exhaust-gas recirculation device for an internal combustion engine, in particular a passenger car diesel engine, with an air-supply line connected to an air inlet of the internal combustion engine and with an exhaust-gas line connected to an exhaust-gas outlet of the internal combustion engine, wherein a turbine, which drives a compressor disposed in the air-supply line, is disposed in the exhaust-gas line, wherein the exhaust-gas line is connected to the air-supply line via an exhaust-gas recirculation line branching off in flow direction behind the turbine and wherein an adjustable throttle is disposed in the air-supply line in flow direction in front of the compressor.

The exhaust-gas recirculation device according to the invention concerns a low-pressure exhaust-gas recirculation device because the exhaust-gas recirculation line branches off from the exhaust-gas line behind the turbine, i.e. downstream from the turbine. Among other advantages, such an exhaust-gas recirculation device has the essential advantage over a high-pressure exhaust-gas recirculation, in which exhaust-gas of the exhaust-line is extracted in front of the turbine, i.e. upstream from the turbine, that the entire exhaust-gas volume of the internal combustion engine passes through the exhaust-gas turbocharger of the internal combustion engine, the turbocharger including the turbine and the compressor. This achieves a very high efficiency of the exhaust-gas turbocharger; the turbocharger can be operated with its full driving power in every operating state of the internal combustion engine. For example, tests have shown that, in case of a four-cylinder engine with a low-pressure exhaust-gas recirculation device, a rotational speed of the turbocharger of about 110,000 1/min can be achieved when the engine is at idle speed; whereas, in case of the same test installation using a high-pressure exhaust-gas recirculation device, a rotational speed of the turbocharger of only about 70,000 1/min can be achieved. Furthermore, a substantial reduction in smoke as well as nitrogen oxide of the exhaust-gas of the internal combustion engine that is still emitted into the environment can be achieved when compared to high-pressure exhaust-gas recirculation devices. With the throttle in the air supply line in accordance with the invention it is advantageously possible to set a high exhaust-gas recirculation rate (EGR rate) even in case of recirculated exhaust-gas that is available with only a very low pressure or no pressure at all. The EGR rate is in this case a measure for the exhaust-gas portion in the mixture of exhaust-gas and fresh air sucked in by the internal combustion engine. The EGR rate can be determined in a simple matter as defined in the following equation:

$$EGR\ Rate = \frac{\text{fresh air mass taken in without } EGR - \text{fresh air mass taken in with } EGR}{\text{fresh air mass taken in without } EGR} \qquad \text{Eq. 1}$$

A particular advantage is that in this case only the respective amount of fresh air that is taken in has to be acquired for determining the EGR rate. By throttling the fresh air, which is possible in accordance with the invention, very high EGR rates of up to about 70% can be advantageously achieved. A relative vacuum is caused by the throttling of the fresh air and, as a result, the recirculated exhaust-gas is sucked in. It is in particular favorable that the invention allows an exhaust-gas recirculation in, within broad limits, any quantity range and in the entire program map of the exhaust-gas recirculation device, in case of a passenger car diesel engine as an internal combustion engine for example up to a rotational speed of about 4,500 1/min. The exhaust-gas recirculation device according to the invention advantageously allows a very early start of the injection and a partly homogeneous operation of the internal combustion engine. The exhaust-gas emissions of the internal combustion engine are low. Furthermore, there is a thorough mixing of the fresh air with the recirculated exhaust-gas in the (intake) air which includes a mixture of exhaust-gas and fresh air and is supplied to the internal combustion engine.

The throttle can in principle be embodied in any desired manner, for example it can be an adjustable valve. In order to provide a high operational reliability of the exhaust-gas recirculation device and low production costs, it is however particularly advantageous if the throttle has a throttle valve or throttle plate, such as a butterfly valve.

It is for example conceivable that the throttle is disposed directly in the junction region of the exhaust-gas recirculation line into the air-supply line. The layout of the exhaust-gas recirculation device, for example also a modular layout, is however simplified in accordance with another advantageous embodiment of the invention in which the throttle is disposed in the air supply line in flow direction in front of the junction of the exhaust-gas recirculation line with the air-supply line, i.e. upstream of the point where the exhaust-gas recirculation line joins the air-supply line. Thus, according to this feature of the invention, the exhaust-gas recirculation line has a junction with the air-supply line; and the adjustable throttle is disposed in the air supply line in flow direction in front of the junction.

With only little construction and design effort and, at the same time, a high operational reliability it is possible in accordance with another advantageous embodiment of the invention to detect the fresh air mass, with the help of which among other things the above-mentioned EGR rate is determined, if an air-mass meter is disposed in the air-supply line in flow direction in front of the junction of the exhaust-gas recirculation line with the air-supply line. The air-mass meter preferably includes a hot-film air-mass sensor; however it can alternatively for example also include a rotary displacement gas meter or a flow meter available under the trademark name DEGUFLOW.

The pollutant emission of the internal combustion engine can advantageously be further reduced in that, according to another embodiment of the invention, a particle filter is disposed in the exhaust-gas line, between the turbine and the point where the exhaust-gas recirculation line branches off. In other words, according to another feature of the invention, the exhaust-gas line has a junction with the exhaust-gas recirculation line, the exhaust-gas recirculation line branches off from the exhaust-gas line at the junction; and a particle filter is disposed in the exhaust-gas line, between the turbine and the junction. Since the junction of the exhaust-gas recirculation line is disposed in flow direction behind the particle filter, i.e. downstream of the particle filter, the exhaust-gas that is recirculated is comparatively clean and furthermore has a comparatively low temperature.

According to another advantageous embodiment of the invention, an adjustable throttle is disposed in the exhaust-gas line in flow direction behind the point where the exhaust-gas recirculation line branches off. In other words, according to another feature of the invention, the exhaust-gas line has a junction with the exhaust-gas recirculation line, the exhaust-gas recirculation line branches off from the exhaust-gas line at the junction; and a further adjustable throttle is disposed in the exhaust-gas line in flow direction behind the junction. Exhaust-gas can in a simple manner be additionally dammed up in the exhaust-gas line by using such a throttle and the portion of the recirculated exhaust-gas can be increased in this manner. A corresponding effect could in principle also be achieved with an EGR pump, which would however result in a more complex design. Damming up the exhaust-gas in flow direction behind a particle filter can advantageously furthermore result in a temperature increase in the entire program map range of the exhaust-gas recirculation device, as a result of which the regeneration of the particle filter can be improved.

According to another feature of the invention, the internal combustion engine is a passenger car diesel engine.

With the objects of the invention in view there is also provided, a method for operating an exhaust-gas recirculation device, which includes the steps of:

providing an air-supply line connected to an air inlet of an internal combustion engine and an exhaust-gas line connected to an exhaust-gas outlet of the internal combustion engine;

providing a turbine disposed in the exhaust-gas line such that the turbine drives a compressor disposed in the air-supply line; and connecting the exhaust-gas line to the air-supply line via an exhaust-gas recirculation line branching off from the exhaust-gas line in flow direction behind the turbine such that during operation of the internal combustion engine the exhaust-gas recirculation line is open in a low-load range of the internal combustion engine as well as in a full-load range of the internal combustion engine allowing exhaust-gas to flow from the exhaust-gas outlet back to the air inlet via the exhaust-gas recirculation line.

In other words, according to the invention, there is provided a method for operating an exhaust-gas recirculation device, in particular one of the exhaust-gas recirculation devices defined above, for an internal combustion engine, in particular a passenger car diesel engine, with an air-supply line connected to an air inlet of the internal combustion engine and with an exhaust-gas line connected to an exhaust-gas outlet of the internal combustion engine, wherein a turbine, which drives a compressor disposed in the air-supply line, is disposed in the exhaust-gas line, wherein the exhaust-gas line is connected to the air-supply line via an exhaust-gas recirculation line branching off in flow direction behind the turbine and wherein, during operation of the internal combustion engine, exhaust-gas can flow from the exhaust-gas outlet back to the air inlet via the exhaust-gas recirculation line and wherein the exhaust-gas recirculation line is open in a low-load range as well as in a full-load range of the internal combustion engine allowing a return flow of the exhaust-gas.

The method according to the invention can be advantageously used in particular in case of a low-pressure exhaust-gas recirculation device for an internal combustion engine, which is embodied as a passenger car diesel engine operating with partial homogenization of the combustion, because this allows to set high EGR rates, which promote the partial homogenization, in all load ranges of the internal combustion engine. This advantageously achieves a substantial reduction of the $NO_x$ emission and particle emission of the internal combustion engine.

In accordance with an advantageous mode of the invention, the exhaust-gas recirculation rate is between 0 and 70% in a rotational speed range of the internal combustion engine between 900 and 3,000 1/min and a mean pressure in a cylinder of the internal combustion engine between 0 and 6 bar. These values are for example achieved in case of a strong throttling of the fresh air fed into the air-supply line. The mean pressure represents the pressure over an entire working cycle, wherein the mean pressure is independent of the internal combustion engine size. This mean pressure is provided as an average during the intake stroke, the compression stroke, the exhaust stroke, and the combustion process in the cylinder. The mean pressure is determined by the following equation, which defines the mean pressure p, which is provided in bar, as a function of the torque M, which is provided in Nm, and the displacement Vd, which is provided in L:

$$\text{mean pressure } p/\text{bar} = 0.1257 \times \frac{\text{torque M/Nm}}{\text{displacement Vd/L}} \qquad \text{Eq. 2}$$

According to another advantageous mode of the invention, the exhaust-gas recirculation rate is between 30 and 70% in a rotational speed range of the internal combustion engine between 900 and 3,500 1/min and a mean pressure in a cylinder of the internal combustion engine between 6 and 12 bar. These values are for example achieved in case of a weak throttling of the fresh air.

According to another advantageous mode of the invention, the exhaust-gas recirculation rate is between 10 and 30% in a rotational speed range of the internal combustion engine between 900 and 4,000 1/min and a mean pressure in a cylinder of the internal combustion engine between 15 and 20 bar, so that even in the full-load range a substantial exhaust-gas recirculation rate is achieved.

According to another advantageous mode of the invention, the exhaust-gas recirculation rate is between 0 and 10% in a rotational speed range of the internal combustion engine between 900 and 4,500 1/min and a mean pressure in a cylinder of the internal combustion engine between 15 and 25 bar. This achieves a significant exhaust-gas recirculation rate even in the full-load range of the internal combustion engine.

Other features which are considered as characteristic for the invention are set forth in the appended claims.

Although the invention is illustrated and described herein as embodied in an exhaust-gas recirculation device and a method for operating an exhaust-gas recirculation device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
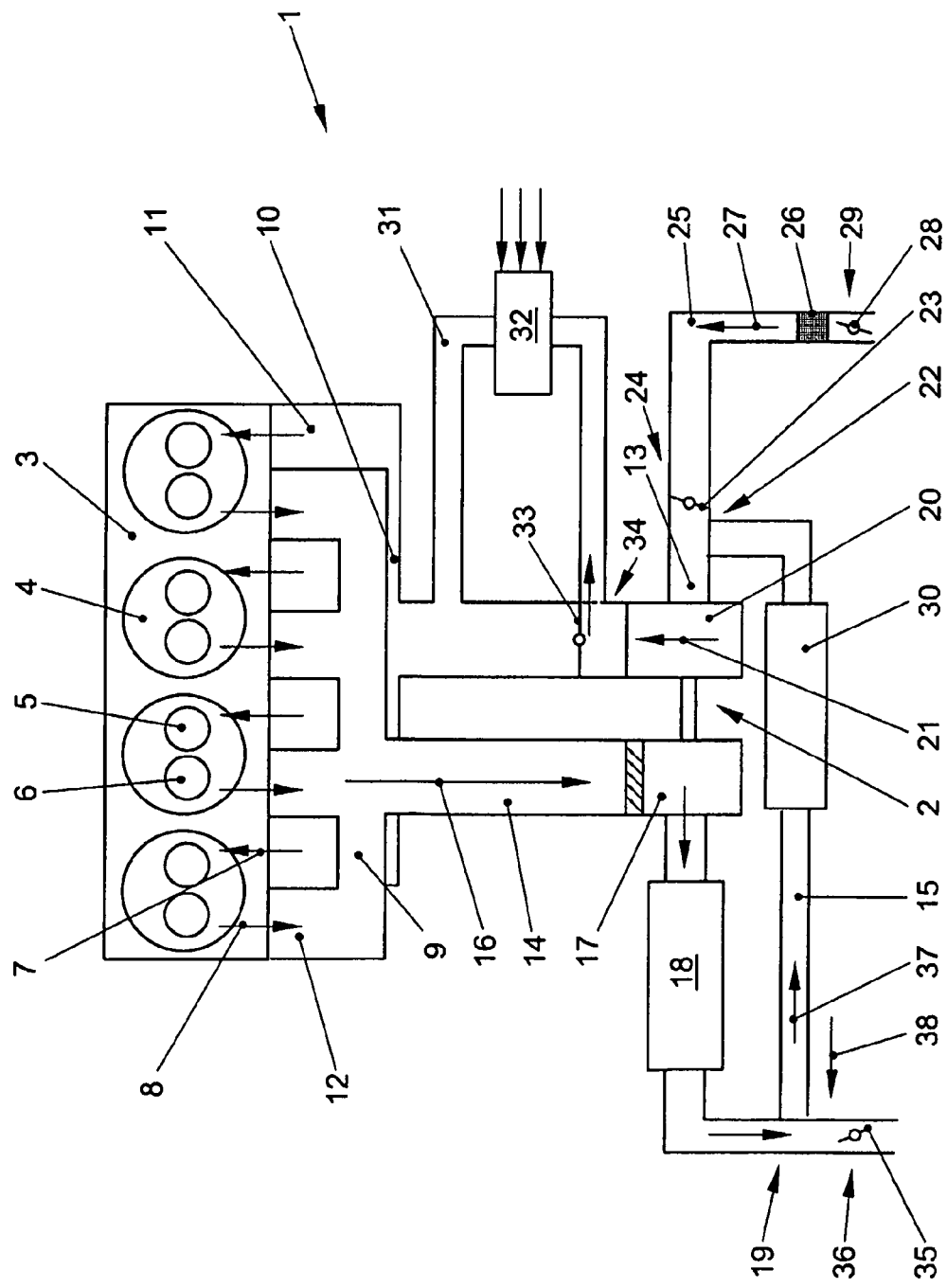
FIG. 1 is a schematic view of an internal combustion engine with an exhaust-gas recirculation device according to the invention.

Referring now to the figures of the drawings in detail and first, particularly, to FIG. 1 thereof, there is shown an exhaust-gas recirculation device 1 for an internal combustion engine 3 which is embodied as a diesel engine for a passenger car with an exhaust-gas turbocharger 2. The internal combustion engine 3 further has four cylinders 4 each having a respective intake valve 5 for air that is sucked in and an outlet valve 6 for discharged exhaust-gas. Intake air flows into the cylinders 4 are symbolized by arrows 7. Accordingly, the outlet exhaust-gas flows from the cylinders 4 are symbolized by arrows 8. Discharged exhaust-gas that escapes via the outlet valves 6 is collected in an exhaust-gas manifold 9. The air to be supplied to the inlet valves 5 is fanned out in an intake manifold 10 in order to be allocated to individual inlet valves 5.

The intake manifold 10 is connected to the intake valves 5 via a respective air inlet 11 and the exhaust manifold 9 is connected to the output valves 6 via a respective exhaust-gas outlet 12. An air-supply line 13 is connected to the intake manifold 10 and an exhaust-gas line 14 of the exhaust-gas recirculation device 1 is connected to the exhaust-gas manifold 9. Furthermore, the exhaust-gas line 14 is connected to the air supply line 13 by an exhaust-gas recirculation line 15 in the exhaust-gas recirculation device 1.

The flow direction of the exhaust-gas in the exhaust-gas line 14 is indicated by an arrow 16 in FIG. 1. The exhaust-gas discharged from the internal combustion engine 3 is guided in the exhaust-gas line 14 via a turbine 17 of the exhaust-gas turbocharger 2 and via a particle filter 18. The turbine 17 as well as the particle filter 18 are disposed upstream of a junction 19 of the exhaust-gas recirculation line 15 with the exhaust-gas line 14, wherein the particle filter 18 is disposed downstream of the turbine 17. The turbine 17 may preferably have a variable turbine geometry.

The turbine 17 of the exhaust-gas turbocharger 2 drives a compressor 20 of the exhaust-gas turbocharger 2, wherein the compressor 20 is disposed in the air-supply line 13, to be precise, when viewed in the flow direction of the air supplied to the internal combustion engine 3 as symbolized by an arrow 21, downstream of a junction 22 of the exhaust-gas recirculation line 15 with the air-supply line 13. A throttle valve 23, which has an adjustable throttle 24, is disposed in flow direction in front (upstream) of the compressor 20 and in front (upstream) of the junction 22 of the exhaust-gas recirculation line 15. The throughput of fresh air, which is supplied through a fresh air line 25, which is a component of the air-supply line 13, is adjustable through the use of the throttle 24. An air-mass meter 26 is provided for detecting the fresh air mass streaming in through the fresh air line 25, wherein the air-mass meter 26 is disposed in the fresh air line 25 in front (upstream) of the throttle 24 when viewed in the flow direction of the fresh air indicated by an arrow 27.

Alternatively, the throttle in the fresh air line 25 of the air-supply line 13 can also be disposed as a throttle 29 having a throttle valve 28 wherein the throttle 29 is disposed in flow direction in front of the air-mass meter 26.

The exhaust-gas recirculation device 1 furthermore has an exhaust-gas cooler 30 in the exhaust-gas recirculation line 15 for cooling recirculated exhaust-gas. The exhaust-gas cooler 30 may for example be a water cooler with its own cooling circuit which is independent from the cooling circuit of the internal combustion engine 3. In this manner it is possible to achieve a cooling of the recirculated exhaust-gas to the temperature well below 100° C.

Furthermore, an air cooler 32 is disposed in an air-supply cooling line 31 at the air-supply line 13. The air-supply line 13 can be closed entirely or closed partly through the use of an air cooling control valve 33 and the air supplied to the internal combustion engine 3 can at the same time be fed into the air-supply cooling line 31 via a junction 34. The air is then cooled when passing through the air cooler 32 and is fed with a reduced temperature to the internal combustion engine 3. In the position shown in FIG. 1, the air cooling control valve 33 completely closes off the air-supply line 13. The air cooling control valve 33 can preferably control the air-supply cooling line 31 in dependence of the load of the internal combustion engine 3, wherein for example a bypassing of the air cooler 32, in other words an opening of the air cooling control valve 33, may occur at a lower and middle partial load of the internal combustion engine 3 and a closing of the air cooling control valve 33 may occur at full load.

An adjustable throttle 36 having a throttle valve 35 is provided in flow direction behind (downstream) of the junction 19 of the exhaust-gas recirculation line 15 in the exhaust-gas line 14 of the exhaust-gas recirculation device 1 in order to additionally dam up exhaust-gas if necessary. A return flow of condensation water from the exhaust-gas recirculation line 15 in a direction opposite to an exhaust-gas flow direction in the exhaust-gas recirculation line 15 that is symbolized by an arrow 37 is symbolized by a further, smaller arrow 38, which points in the opposite direction.

Figure 2:
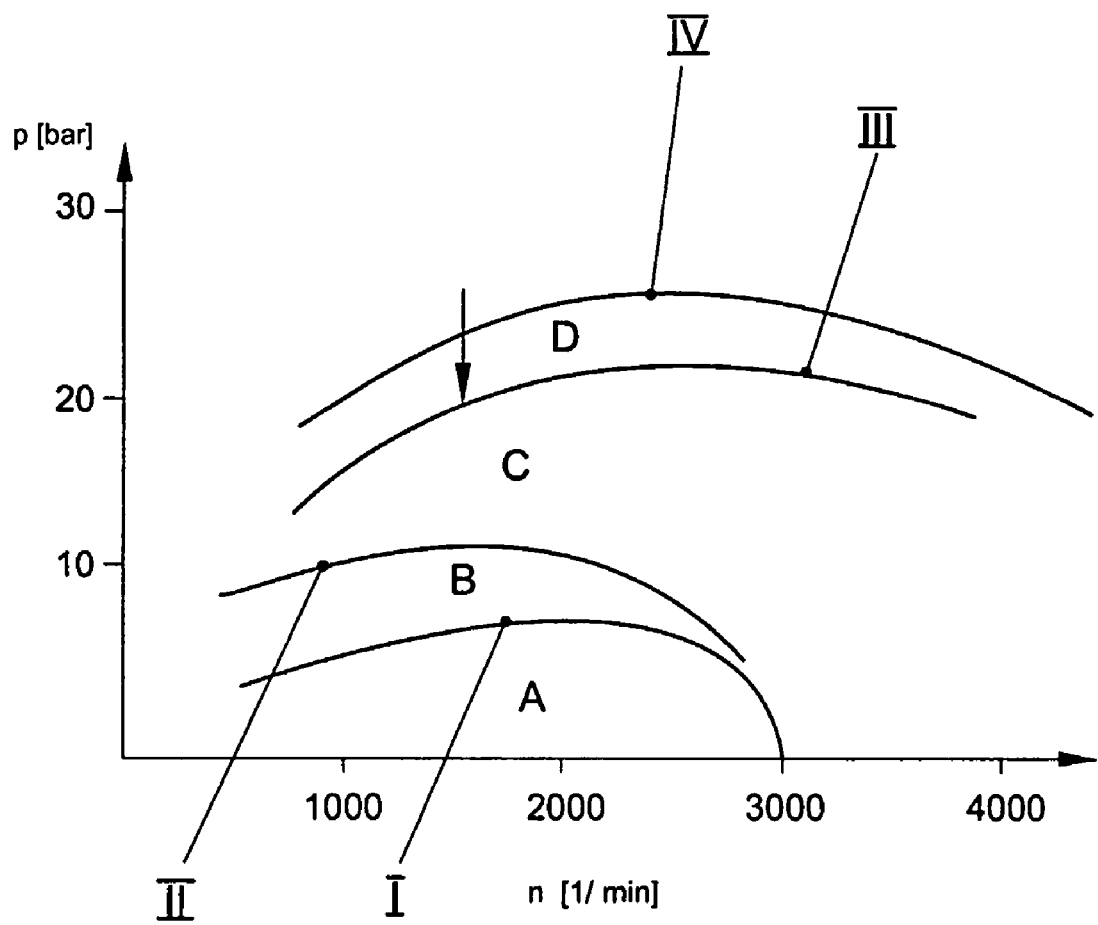
FIG. 2 is a graph illustrating various exhaust-gas recirculation rate regions according to the invention.

FIG. 2 is a graph illustrating different EGR (exhaust-gas recirculation) rate regions of the internal combustion engine and the exhaust-gas recirculation device shown in FIG. 1 for a respective different throttling in the intake region. In this case, a mean pressure p, which is given in bar, in a cylinder of the internal combustion engine is plotted over a rotational speed n, which is given in 1/min. The mean pressure p represents the mean pressure over the entire working cycle in the cylinder; the pressure during individual phases of the working cycle can however be much higher, for example, the pressure during the combustion can be about 200 bar (20 MPa).

Curve I, which is shown at the bottom of the graph of FIG. 2, delimits an area A in which in case of a considerable throttling of the fresh air (fresh air line almost closed) in a rotational speed range of the internal combustion engine of about 900 to about 3,000 1/min and a mean pressure p in a cylinder of the internal combustion engine of about 0 to about 6 bar, the exhaust-gas recirculation rate is 0 to 70%.

A curve II, which lies above the aforementioned curve I, delimits an area B, in which in case of a reduced throttling of the fresh air in a rotational speed range of the internal combustion engine of about 900 to about 3,000 1/min and a mean pressure p in a cylinder of the internal combustion engine of about 6 to about 12 bar, the exhaust-gas recirculation rate is 30 to 70%.

A further curve III, delimits an area C, in which in case of a weak throttling of the fresh air in a rotational speed range of the internal combustion engine of about 900 to about 4,000 1/min and a mean pressure p in a cylinder of the internal combustion engine of about 15 to about 20 bar, the exhaust-gas recirculation rate is 10 to 30%.

A last curve IV delimits an area D, in which in a rotational speed range of the internal combustion engine of about 900 to about 4,500 1/min and a mean pressure p in a cylinder of the internal combustion engine of about 15 to about 25 bar, the exhaust-gas recirculation rate is 0 to 10%.

What is claimed is:

1. A method for recirculating exhaust cias, the method which comprises:

providing an internal combustion engine operating with a partial homogeniztion of a combustion;

providing an air-supply line connected to an air inlet of the internal combustion engine and an exhaust-gas line connected to an exhaust-gas outlet of the internal combustion engine;

providing a turbine disposed in the exhaust-gas line such that the turbine drives a compressor disposed in the air-supply line;

connecting the exhaust-gas line to the air-supply line via an exhaust-gas recirculation line of a low-pressure exhaust-cias recirculation device, the exhaust-gas recirculation line branching off from the exhaust-gas line in flow direction behind the turbine such that during operation of the internal combustion engine the exhaust-gas recirculation line is open in a low-load range of the internal combustion engine as well as in a full-load range of the internal combustion engine allowing exhaust-gas to flow from the exhaust-gas outlet back to the air inlet via the exhaust-gas recirculation line; and providing an exhaust-gas recirculation rate between 30 and 70% in a rotational speed range of the internal combustion engine between 900 and 3,500 1/mm and a mean pressure in a cylinder of the internal combustion engine between 6 and 12 bar.

2. The method according to claim 1, which comprises providing a passenger car diesel engine as the internal combustion engine.

* * * * *